US012665622B2

(12) United States Patent
Horn et al.

(10) Patent No.: US 12,665,622 B2
(45) Date of Patent: Jun. 23, 2026

(54) TRANSMITTER NOISE MITIGATION BASED ON A NOISE INDICATOR

(71) Applicant: QUALCOMM Incorporated, San Diego, CA (US)

(72) Inventors: Idan Michael Horn, Hod Hasharon (IL); Erez Havakuk, Petah Tikva (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 18/316,142

(22) Filed: May 11, 2023

(65) Prior Publication Data

US 2024/0380422 A1     Nov. 14, 2024

(51) Int. Cl.
*H04B 1/04*          (2006.01)
*H04W 76/10*       (2018.01)

(52) U.S. Cl.
CPC ........... *H04B 1/0475* (2013.01); *H04W 76/10* (2018.02)

(58) Field of Classification Search
CPC .............................. H04B 1/0475; H04W 76/10
See application file for complete search history.

(56) References Cited

U.S. PATENT DOCUMENTS

| | | | | | | |
|---|---|---|---|---|---|---|
| 4,186,349 | A | * | 1/1980 | Gordy | .................. | H04B 1/1036 |
| | | | | | | 375/349 |
| 8,483,641 | B1 | * | 7/2013 | Mayrench | ............ | H04B 1/1027 |
| | | | | | | 455/226.1 |

| | | | | | | |
|---|---|---|---|---|---|---|
| 10,044,489 | B2 | * | 8/2018 | Pajukoski | ............. | H04L 5/0032 |
| 2003/0185285 | A1 | * | 10/2003 | Talwar | ................. | H04B 7/0842 |
| | | | | | | 375/148 |
| 2006/0256845 | A1 | * | 11/2006 | Durand | .................... | H04B 1/30 |
| | | | | | | 375/E1.018 |
| 2008/0225979 | A1 | * | 9/2008 | Prasad | .................. | H04L 1/0631 |
| | | | | | | 375/285 |
| 2009/0089851 | A1 | * | 4/2009 | Guo | ................. | H04N 21/44209 |
| | | | | | | 725/125 |
| 2009/0247107 | A1 | * | 10/2009 | Roy | ..................... | H04B 7/0854 |
| | | | | | | 455/296 |
| 2011/0235622 | A1 | * | 9/2011 | Kasher | .................. | H04L 5/0023 |
| | | | | | | 375/227 |
| 2012/0069940 | A1 | * | 3/2012 | Guo | ........................ | H04J 11/005 |
| | | | | | | 375/346 |
| 2014/0003266 | A1 | * | 1/2014 | Gomadam | ............. | H04B 7/024 |
| | | | | | | 370/252 |
| 2014/0153510 | A1 | * | 6/2014 | Gomadam | ............. | H04B 7/024 |
| | | | | | | 370/329 |

(Continued)

*Primary Examiner* — Jinsong Hu
*Assistant Examiner* — Rui M Hu
(74) *Attorney, Agent, or Firm* — NORTON ROSE FULBRIGHT US LLP

(57)          ABSTRACT

This disclosure provides systems, methods, and devices for wireless communication that support noise indicator inter-mediated signal demodulation. An apparatus for wireless communication may include a communication interface configured to receive a noise indicator that indicates a transmitter noise associated with a transmitter. Additionally, the apparatus may include a processor system configured to demodulate, based on a noise covariance matrix, a signal received from the transmitter. The noise covariance matrix may be based on the noise indicator.

29 Claims, 6 Drawing Sheets

(56) References Cited

U.S. PATENT DOCUMENTS

| | | | |
|---|---|---|---|
| 2015/0264594 A1* | 9/2015 | Davydov | H04W 72/51 |
| | | | 370/252 |
| 2016/0088646 A1* | 3/2016 | Sun | H04L 1/0028 |
| | | | 370/329 |
| 2016/0094285 A1* | 3/2016 | Ayoughi | H04B 7/0617 |
| | | | 370/317 |
| 2016/0157243 A1* | 6/2016 | Janis | H04J 11/0056 |
| | | | 370/329 |
| 2018/0123652 A1* | 5/2018 | Ko | H04L 1/0054 |
| 2019/0342057 A1* | 11/2019 | Rico Alvarino | H04W 72/52 |
| 2020/0278431 A1* | 9/2020 | Zhu | G01S 17/10 |
| 2022/0131588 A1* | 4/2022 | Elshafie | H04B 7/0626 |
| 2023/0098162 A1* | 3/2023 | Gurevitz | H04B 17/345 |
| | | | 455/63.1 |
| 2023/0121167 A1* | 4/2023 | Cui | H04W 28/02 |
| | | | 370/252 |
| 2023/0396470 A1* | 12/2023 | Frank | H04L 25/03968 |
| 2024/0179734 A1* | 5/2024 | Zhang | H04W 72/0446 |
| 2024/0187120 A1* | 6/2024 | Qiu | H04L 5/0073 |
| 2025/0096860 A1* | 3/2025 | Visoz | H04L 25/021 |
| 2025/0309930 A1* | 10/2025 | Seo | H04B 1/0475 |

* cited by examiner

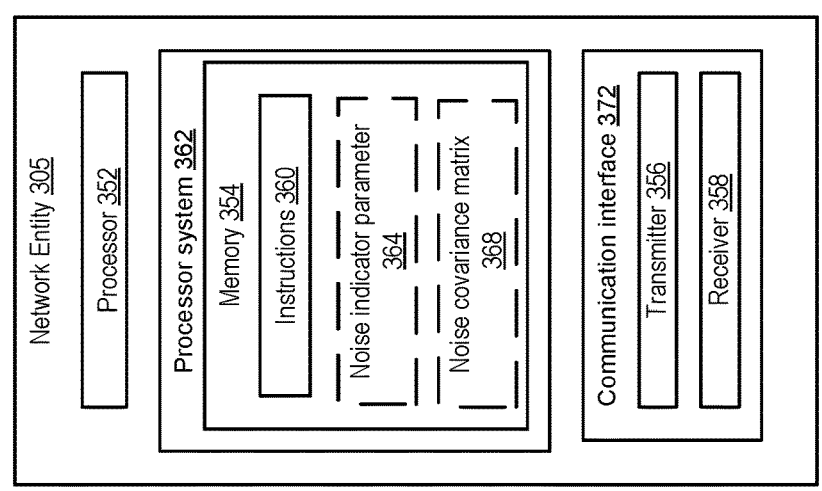
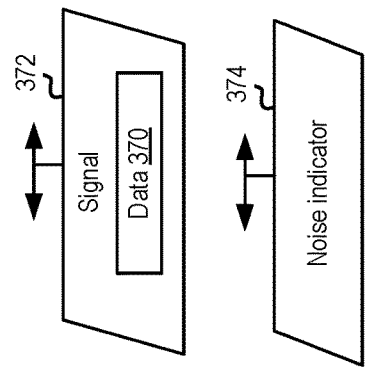
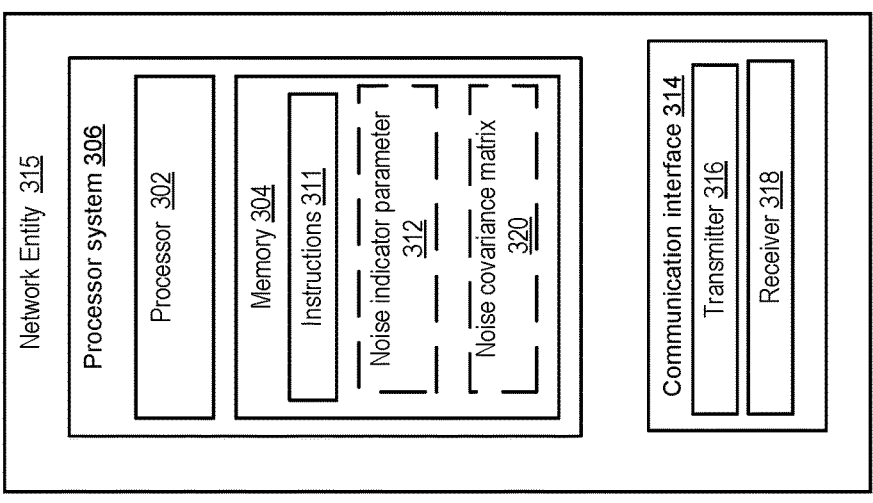
FIGURE 3

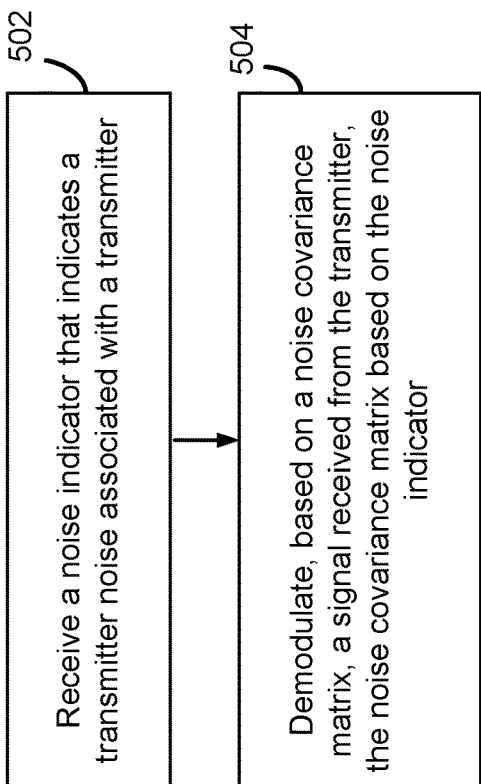

600

602

Generate a noise indicator that is indicative of a transmitter noise associated with a transmitter

604

Transmit the noise indicator

Receive a noise indicator that indicates a transmitter noise associated with a transmitter

504

Demodulate, based on a noise covariance matrix, a signal received from the transmitter, the noise covariance matrix based on the noise indicator

*FIGURE 5*

TRANSMITTER NOISE MITIGATION BASED ON A NOISE INDICATOR

TECHNICAL FIELD

Aspects of the present disclosure relate generally to wireless communication systems, and more particularly, to transmitter noise mitigation based on a noise indicator. Some features may enable and provide enhanced extraction of transmitter-induced noise experienced at a network entity.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Noise attributable to a transmitter of a first network entity and received at a receiver of a second network entity may negatively impinge upon a quality of communication. Sources of such transmitter attributable noise may include a limited digital-to-analog converter (DAC) effective number of bits (ENOB), a nonlinear behavior of RF components of the first transmitter device, use of clip and filtering techniques in telecommunications, additive white Gaussian noise (AWGN) introduced into a transmitted signal, or combinations thereof. Accurately estimating such transmitter induced noise at the receiver of the second network entity has been challenging due, at least in part, to the difficulty of wide band noise estimation. Such difficulty has been partially attributable to physical resource block group (PRG) sizes.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus for wireless communication is provided. The apparatus includes a communication interface configured to receive a noise indicator that indicates a transmitter noise associated with a transmitter. Additionally, the apparatus includes a processor system configured to demodulate, based on a noise covariance matrix, a signal received from the transmitter. The noise covariance matrix is based on the noise indicator.

In an additional aspect of the disclosure, a method for wireless communication is provided. The method includes receiving a noise indicator that indicates a transmitter noise associated with a transmitter. Additionally, the method includes demodulating, based on a noise covariance matrix, a signal received from the transmitter. The noise covariance matrix is based on the noise indicator.

In an additional aspect of the disclosure, an apparatus for wireless communication is provided. The apparatus includes means for receiving a noise indicator that indicates a transmitter noise associated with a transmitter. Additionally, the apparatus includes means for demodulating, based on a noise covariance matrix, a signal received from the transmitter. The noise covariance matrix is based on the noise indicator.

In an additional aspect of the disclosure, a non-transitory computer-readable storage medium storing instructions that, when executed by one or more processors, cause the one or more processors to perform operations for wireless communication is provided. The operations include receiving a noise indicator that indicates a transmitter noise associated with a transmitter. Additionally the operations include demodulating, based on a noise covariance matrix, a signal received from the transmitter. The noise covariance matrix is based on the noise indicator The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports transmitter noise mitigation based on a noise indicator according to one or more aspects.

FIG. 5 is a flow diagram illustrating an example of process that supports transmitter noise mitigation based on a noise indicator according to one or more aspects.

FIG. 6 is a block diagram illustrating an example of network device that supports transmitter noise mitigation based on a noise indicator according to one or more aspects.

Like reference numbers and designations in the various drawings indicate like elements.

DETAILED DESCRIPTION

Figure 1:
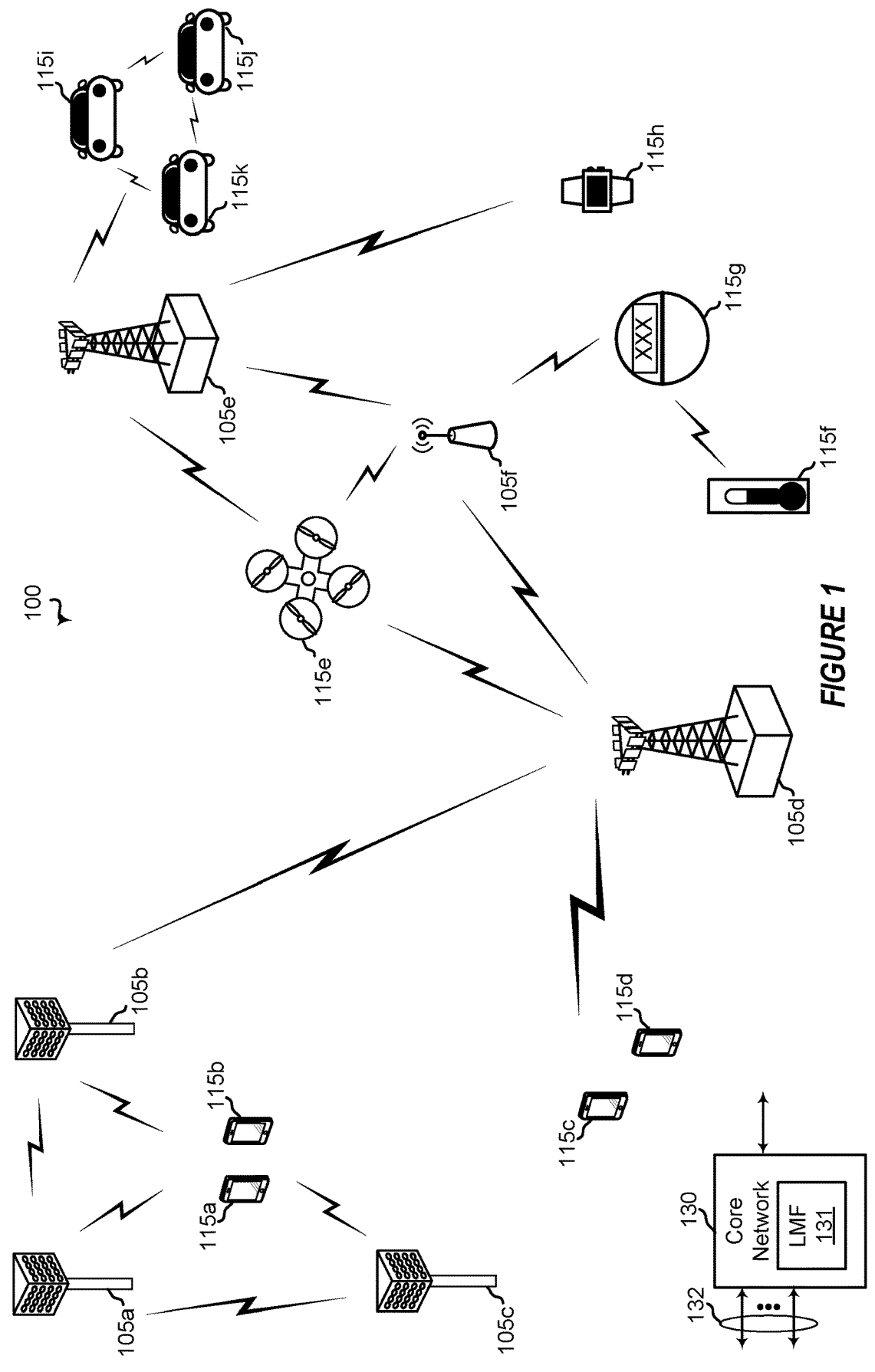
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support transmitter noise mitigation based on a noise indicator. An apparatus for wireless communication, such as a first network entity, may include a communication interface configured to receive a noise indicator. For instance, the apparatus may receive the noise indicator from a second network entity. The noise indicator may indicate a transmitter noise associated with a transmitter, such as the transmitter of the second network entity. Additionally, the apparatus may include a processor system configured to demodulate, based on a noise covariance matrix, a signal received from the transmitter, such as received from the transmitter of the second network entity. The noise covariance matrix may be based on the noise indicator.

Particular implementations of the subject matter described in this disclosure may be implemented to realize one or more of the following potential advantages or benefits. In some aspects, the present disclosure provides techniques for transmitter noise mitigation based on a noise indicator. The described techniques may provide enhanced cancelation or extraction of transmitter induced noise in a received signal. For instance, a noise covariance matrix determined, by a first network entity, based on a noise indicator, received at the first network entity from a second network entity, rather than determined, by the first network entity, based on measured noise samples, such as noise samples measured by the first network entity or by the second network entity, may provide a more accurate and precise indicator of transmitter induced noise in a signal. Accordingly, demodulation, by the first network entity, of a signal received from a transmitter of the second network entity, using a noise covariance matrix based on the noise indicator received by the first network entity from the second network entity may result in an improved quality of communication.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP)

defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115c, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
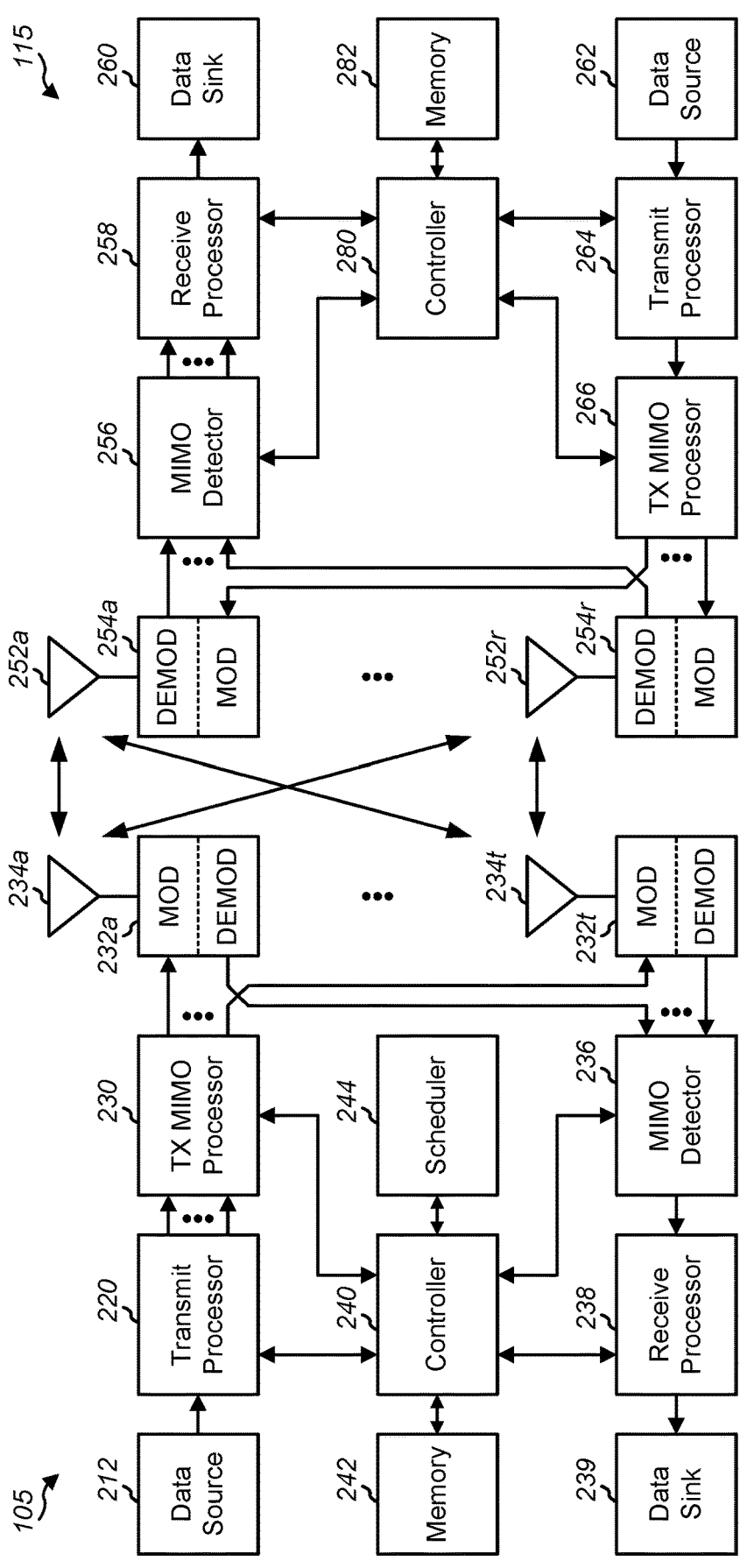
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4-6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

FIG. 3 is a block diagram of an example wireless communications system 300 that supports transmitter noise mitigation based on a noise indicator according to one or more aspects. In some examples, wireless communications system 300 may implement aspects of wireless network 100. Wireless communications system 300 includes network entity 315 and network entity 305. For case of reference and without limiting the generality of the foregoing terms, network entity 305 may be referred to as first network entity 305 or transmitting network entity 305, and network entity 315 may be referred to as second network entity 315 or receiving network entity 315. In some implementations, first network entity 305 may correspond to base station 105, and second network entity 315 may correspond to UE 115. However, in other implementations, first network entity 305 may correspond to UE 115 and second network entity 315 may correspond to base station 105. Although two network entities 305, 315 are illustrated, in some other implementations, wireless communications system 300 may generally include multiple network entities, which may correspond to UEs 115, base stations 105, or combinations thereof.

Second network entity 315 may include a variety of components (such as structural, hardware components) used for carrying out one or more functions described herein. For example, these components may include processor system

306 and one or more communication interfaces 314 (hereinafter referred to collectively as "communication interface 314").

Processor system 306 may include one or more processors 302 (hereinafter referred to collectively as "processor 302"), one or more memory devices 304 (hereinafter referred to collectively as "memory 304"), or combinations thereof. Processor 302 may be configured to execute instructions 311 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 311 and, in some implementations, memory 304 may be configured to store one or more noise indicator parameters 312 (hereinafter referred to collectively as "noise indicator parameter 312"), one or more noise covariance matrices 320 (hereinafter referred to collectively as "noise covariance matrix 320"), or both. Noise indicator parameter 312 may include or correspond to a parameter to generate noise indicator 374. For example, noise indicator parameter 312 may include or correspond to one or more characteristics of transmitter noise introduced into signal 372 generated by transmitter 316 of second network entity 315. As illustrative, non-limiting examples, the one or more characteristics may include or correspond to an uplink (UL) error vector magnitude (EVM), a downlink (DL) EVM, a full bandwidth (BW) of the transmitter, a vector per bandwidth part (BWP) size, or a combination thereof.

Noise covariance matrix 320 may include or correspond to one or more covariance matrices. For example, a first covariance matrix of covariance matrix 320 may be generated based on noise indicator 374 and may be configured to mitigate noise (e.g., transmitter noise) introduced into signal 372 by transmitter 356 of first network entity 305. A second covariance matrix of covariance matrix 320 may be generated based on noise measurements performed by second network entity 315, first network entity 305, or a combination thereof and may, likewise, be configured to mitigate noise introduced into signal 372 by transmitter 356 of first network entity 305.

Communication interface 314 may include one or more transmitters 316 (hereinafter referred to collectively as "transmitter 316"), one or more receivers 318 (hereinafter referred to collectively as "receiver 318"), or a combination thereof. Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, network entity 305. In some implementations, transmitter 316 and receiver 318 may be integrated in one or more transceivers. Additionally, or alternatively, transmitter 316 or receiver 318 may include or correspond to one or more components of UE 115, base station 105, or both described with reference to FIG. 2.

In some implementations, second network entity 315 may include one or more antenna arrays. The one or more antenna arrays may be coupled to transmitter 316, receiver 318, or to communication interface 314. The antenna array may include multiple antenna elements configured to perform wireless communications with other devices, such as with network entity 305. In some implementations, the antenna array may be configured to perform wireless communications using different beams, also referred to as antenna beams. The beams may include transmit (TX) beams and receive (RX) beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of UE 115, base station 105, or both. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Second network entity 315 may include one or more components as described herein with reference to UE 115, base station 105, or both. In some implementations, second network entity 315 is a 5G-capable UE, a 6G-capable UE, or a combination thereof. In other implementations, second network entity 315 is a base station 105 configured to perform communication operations in accordance with 5G protocols, 6G protocols, or both.

First network entity 305 may include a variety of components (such as structural, hardware components) used for carrying out one or more functions described herein. For example, these components may include a processor system 362 and one or more communication interfaces 372 (hereinafter referred to collectively as "communication interface 372").

Processor system 362 may include one or more processors 352 (hereinafter referred to collectively as "processor 352"), one or more memory devices 354 (hereinafter referred to collectively as "memory 354"), or a combination thereof. Processor 352 may be configured to execute instructions 360 stored in memory 354 to perform the operations described herein. In some implementations, processor 352 includes or corresponds to one or more of receive processor 238, transmit processor 220, and controller 240, and memory 354 includes or corresponds to memory 242. First network entity 305 may include or correspond to UE 115 or to base station 105.

Memory 354 includes or is configured to store instructions 360 and, in some implementations, memory 354 may be configured to store one or more noise indicator parameters 364 (hereinafter referred to collectively as "noise indicator parameter 364"), one or more noise covariance matrices 368 (hereinafter referred to collectively as "noise covariance matrix 368"), or both. Noise indicator parameter 364 may include or correspond to a parameter to generate noise indicator 374. For example, noise indicator parameter 364 may include or correspond to one or more characteristics of transmitter noise introduced into a signal 372 generated by transmitter 356 of first network entity 305. Such one or more characteristics may include or correspond to a UL EVM, a DL EVM, a full BW of the transmitter, a vector per BWP size, or a combination thereof.

Noise covariance matrix 368 may include or correspond to one or more covariance matrices. For example, a first covariance matrix of covariance matrix 368 may be generated based on noise indicator 374 and may be configured to mitigate noise (e.g., transmitter noise) introduced into signal 372 by transmitter 316 of second network entity 315 (e.g., when second network entity 315 generates and transmits signal 372). A second covariance matrix of covariance matrix 368 may be generated based on noise measurements performed by second network entity 315, first network entity 305, or a combination thereof and may, likewise, be configured to mitigate noise introduced into signal 372 by transmitter 316 of second network entity 315.

Communication interface 372 may include one or more transmitters 356 (hereinafter referred to collectively as "transmitter 356"), one or more receivers 358 (hereinafter referred to collectively as "receiver 358"), or a combination thereof. Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of UE 115, base station 105, or both described with reference to FIG. 2.

In some implementations, first network entity 305 may include one or more antenna arrays. The antenna array may include multiple antenna elements configured to perform wireless communications with other devices, such as with second network entity 315. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of UE 115, base station 105, or both. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

First network entity 305 may include one or more components as described herein with reference to UE 115, base station 105, or both. In some implementations, first network entity 305 is a 5G-capable UE, a 6G-capable UE, or a combination thereof. In other implementations, first network entity 305 is a base station 105 configured to perform communication operations in accordance with 5G protocols, 6G protocols, or both.

In some implementations, wireless communications system 300 implements a 5G NR network. For example, wireless communications system 300 may include multiple 5G-capable network entities 305, 315, such as UEs and base stations configured to operate in accordance with a 5G NR network protocol such as that defined by the 3GPP. In some other implementations, wireless communications system 300 implements a 6G network.

During operation of wireless communications system 300, first network entity 305 may generate and transmit signal 372 containing data 370 to second network entity 315. Signal 372 may include noise, such as transmitter noise, introduced into signal by transmitter 356 of first network entity 305. The transmitter noise may be associated with each port of transmitter 356 of network entity 305, may be from each antenna of transmitter 356 of network entity 305, may be from each panel of transmitter 356 of network entity 305, or a combination thereof.

Additionally, first network entity 305 may generate noise indicator 374. Noise indicator 374 may indicate the transmitter noise associated with transmitter 356 of first network entity 305. For example, noise indicator 374 may include or correspond to a noise ratio per layer, an EVM distortion factor, a noise floor, or a combination thereof.

In implementations, first network entity 305 may generate noise indicator 374 based on noise indicator parameter 364. Noise indicator parameter 364 may characterize transmitter noise introduced into signal 370 transmitted by transmitter 356 of first network entity 305. For example, noise indicator parameter 365 may include or correspond to on a UL EVM, a DL EVM, a full BW of the transmitter, a vector per BWP size, or a combination thereof.

Subsequently, first network entity 305 may be configured to transmit noise indicator 374 to second network entity 315. In some implementations noise indicator 374 may be included in signal 372 with data 370 and sent concurrently with signal 372 and data 370 on a same channel as signal 372 and data 370. In other implementations, noise indicator 374 may be transmitted separately from signal 374 and data 370, may be sent on a different channel from the channel on which signal 372 and data 370 are sent, or a combination thereof. As an example, first network entity 305 may be configured to initiate a communication session with second network entity 315 and may be configured to transmit network indicator 374 as part of initiation of the communication session. In implementations, first network entity 305 may be configured to transmit noise indicator 374 in a radio resource control (RRC) message, a medium access control (MAC)-control element (CE) message, downlink control information (DCI), or a caching and downlink resource sharing optimization framework (CSF).

Communication interface 314 of second network entity 315 may be configured to receive each of signal 372, data 370, noise indicator 374, or combinations thereof. For instance, if signal 372 includes noise indicator 374 and data 370, receiver 318 of second network entity 315 may be configured to receive signal 372, and processor system 306 may be configured to extract noise indicator 374, noise information included in noise indicator 374, or both from signal 372. Alternatively, if noise indicator 372 is received separately from signal 372 and data 370, receiver 318 of second network entity 315 may be configured to receive noise indicator 372, and processor system 306 may be configured to extract the noise information from noise indicator 372.

The noise information may be associated with transmitter noise of transmitter 356 of first network entity 305. For example, noise information may include an amplitude value corresponding to an amplitude of the transmitter noise, a phase value corresponding to a phase of the transmitter noise, a variance value corresponding to a variance of the transmitter noise, a standard deviation value corresponding to a standard deviation of the transmitter noise, or a combination thereof. As another example, noise indicator 374 may further indicate that the transmitter noise is in-band noise or out-of-band noise, a level of the transmitter noise, whether the transmitter noise was present before or after precoding of the signal, or a combination thereof.

Additionally, processor system 306 of network entity 315 may be configured to determine noise covariance matrix 320 (e.g., one or more noise covariance matrices). For example, processor system 306 may be configured to determine a first covariance matrix that is based on noise indicator 374. Additionally, processor system 306 may be configured to determine a second noise covariance matrix based on empirical (e.g., measured) noise data. For instance, processor system 306 may be configured to acquire noise data by measuring noise associated with signal 372, generating or receiving signal to interference noise ratio (SINR) data (e.g., received from first network entity 305), or a combination thereof.

Processor system 306 may be configured to process signal 372 based on the first noise covariance matrix. For example, processor system 306 may be configured to demodulate signal 372 based on the first noise covariance matrix. Additionally, or alternatively, processor system 306 may be configured to process signal 372 (e.g., demodulate signal 372) based on the second noise covariance matrix. In some implementations, whether processor system 306 processes signal 372 based on the first noise covariance matrix or based on the second noise covariance matrix may depend on identification, by processor system 306, of a dominant noise source. A dominant noise source may correspond to a dominant source of noise in signal 372, such as whether noise in signal 372 is principally attributable to transmitter 356 of first network entity 305 or whether other sources of noise are dominant, such as noise attributable to receiver 318 of second network entity 315.

To identify the dominant noise source, processor system 306 may be configured to compare values of the noise information extracted or obtained from noise indicator 374 with other noise data. For example, processor system 306 may be configured to compare a first variance of a channel estimated transmit noise derived from noise indicator 374 and a second variance of a channel estimated noise measured at a receiver, such as measured at receiver 318 of second network entity 315, receiver 358 of first network entity 305, or both. The channel estimate noise may include the transmit noise (e.g., noise introduced into a signal by transmitter 356 of first network entity 305) and a receive noise associated with receiver 318 of second network entity 315. The receive noise may include or correspond to noise introduced into a signal by receiver 318 of network entity 315 when a signal 372 is received at network entity 315. As an example, in response to the first variance being equal to or greater than the second variance, processor system 306 may be configured to process signal 372 using the first covariance matrix that is based on noise indicator 374 rather than the second covariance matrix that is based on empirical noise measurements.

As another example, processor system 306 may be configured to compare an EVM distortion factor, a noise floor, a noise ratio per layer, or a combination thereof, extracted from noise indicator 374, and a measured SINR value. In other implementations, processor system 306 may be configured to compare a receiver noise parameter to the noise information included in or obtained from noise indicator 374. The receiver noise parameter may include a receiver noise variance. By identifying a receiver noise parameter, network entity 315 may be configured to determine whether a source of noise in a signal transmitted by network entity 305 and received via communication interface 314 is principally attributable to transmitter 356 of network entity 305 or rather is principally attributable to distortions introduced into the transmitted signal by receiver 318 upon receipt of the transmitted signal.

In some implementations, processor system 306 of first network entity 315 may be configured to initiate transmission, to second network entity 305, of a first indicator that includes an indication of the dominant noise source, that the noise covariance matrix is based on noise indicator 374, or a combination thereof. In some implementations, communication interface 314 of network entity 315 may be configured to receive a second indicator from first network entity 305 that includes an indication to continue to use the noise covariance matrix that is based on noise indicator 374. For instance, first network entity 305 may be configured to generate the second indication in response to receipt of the first indication from second network entity 315, in response to receipt of the measured SINR value from second network entity 315, or a combination thereof. In implementations, the second indication may include a precoding indicator.

In some implementations, communication interface 314 may be configured to receive one or more additional noise indicators after receipt of noise indicator 374. The one or more additional noise indicators may be received periodically or aperiodically. In some implementations, to receive the one or more additional noise indicators, communication interface 314 may be configured to receive the one or more additional noise indicators in response to a time varying transmitter condition of transmitter 356. The time varying transmitter condition may include or correspond to a change in bandwidth, a channel condition, a power amplifier (PA) output power, or a combination thereof. In this manner, in response to changing transmitter conditions that may introduce different types or quantities of noise into a signal transmitter by transmitter 356, one or more new noise indicator may be generated that convey, to network entity 315, information about the time varying noise characteristics introduced by transmitter 356 into the transmitted signal.

An example of the foregoing cycle of operation applied to a signal is provided for illustrative purposes. Transmitter 356 of first network entity 305 may transmit signal 372 that includes noise indicator 374, which receiver 318 of network entity 315 receives as signal $Y_{Rx} = H_{RxTx} \, PS + H_{RxTx} n_{Tx} + n_{Rx}$, where $H_{RxTx}$ is a channel estimation of a channel on which data 370 is sent to network entity 305, P represents a precoding applied by network entity 305 to the transmitted signal, S represents data 370 included in the transmitted signal, $n_{Tx}$ represents noise indicator 374 generated by network entity 305, and $n_{Rx}$ represents noise introduced into the signal $Y_{Rx}$ by receiver 318 of network entity 315. In some implementations, receiver 318 of network entity 315 may be configured to estimate $H_{RxTx}$ based on reference signals, such as dedicated demodulation reference signals (DMRS). Based on the foregoing components, processor system 306 may determine noise covariance matrix $R_{nn}$. In particular, $R_{nn}=H_{RxTx}*STD(n_{Tx})*(H_{RxTx}*STD(n_{Tx}))*$, where $STD(n_{Tx})$ is the standard deviation of the noise indicator, and $(H_{RxTx}*STD(n_{Tx}))*$ is the conjugate of $H_{RxTx}*STD(n_{Tx})$.

In some implementations, processor system 306 of network entity 315 may determine an SINR value of the signal $Y_{Rx}$. Additionally, in implementations, network entity 315 may determine a second covariance matrix $R_{HH}$ based on empirical noise measurements rather than based on noise indicator 374. Processor system 306 of network entity 315 may calculate the second covariance matrix $R_{HH}$ using the channel estimation as follows: $R_{HH}=H_{RxTx}*I*H^{H}_{RxTx}$, where I is an identity matrix and $H^{H}_{RxTx}$ is the transpose of $H_{RxTx}$.

To determine whether to use the covariance matrix $R_{nn}$, generated based on noise indicator 374, or the covariance matrix $R_{HH}$, generated based on noise measurements, processor system 306 may compare one or more parameters extracted from or associated with noise indicator 374 with one or more parameters extracted from or associated with the SINR, such as a receiver noise parameter. For instance, in some implementations, processor system 306 may determine a variance of a noise indicator parameter, $Var(Hn_{Tx})$ and may also determine a variance of receiver noise parameter $Var(Hn_{Tx}+n_{Rx})$. Subsequently, processor system 306 may compare the foregoing variance values. In response to $Var(Hn_{Tx})<Var(Hn_{Tx}+n_{Rx})$, indicating, for example, that noise introduced into signal $Y_{Rx}$ by receiver 318 is a dominant noise factor, processor system 306 may be configured to select $R_{HH}$ to process signal $Y_{Rx}$ (e.g., by demodulating signal 372). Conversely, in response to $Var(Hn_{Tx})\geq Var(Hn_{Tx}+n_{Rx})$, indicating that noise introduced by transmitter 356 of network entity 305 is a dominant noise factor, processor system 306 may be configured to select $R_{nn}$, to process signal $Y_{Rx}$ (e.g., by demodulating signal 372).

In some implementations, processor system 306 may estimate a noise variance, such as a noise variance of transmitter noise (e.g. noise introduced by transmitter 356 of network entity 305), a noise variance of receiver noise (e.g., additive white Gaussian noise (AWGN) introduced by receiver 318 of network entity 315), or a combination thereof. For instance, assume that receiver 318 of network entity 315 receives signal $y=H(x+\delta x)+n$, where $\delta x$ represents transmitter noise introduced by a transmitter, such as transmitter 356 of network entity 305, and n represents receiver noise introduced into the signal by a receiver, such as receiver 318 of network entity 315. Assuming that the receiver noise variance $$\sigma_n^2 = E(nn^*)$$

is known, an estimate of the receiver noise variance is given by $$\hat{\sigma}_n^2 = E\{|y - Hx|^2\} = E\{|H\delta x + n|^2\} = H\sigma_{\delta x}^2 H^* + \sigma_n^2,$$

and an estimate of the transmitter noise variance is given by $$\hat{\sigma}_{\delta x}^2 = \frac{1}{N_{Rx}}\sum_{Rx_i \in N_{Rx}} \frac{\left(\hat{\sigma}_n^2(Rx_i) - \sigma_n^2(Rx_i)\right)}{|H(Rx_i)|^2}.$$

While the foregoing cycle of operation is described with reference to first network entity 305 as generating and transmitting noise indicator 374, and second network entity 315 as receiving noise indicator 374 and demodulating signal 372, based on a noise covariance matrix determined in accordance with noise indicator 374, first network entity 305 may perform the functions of second network entity 315 and vice versa. For instance, second network entity 315 may be configured to generate and transmit noise indicator 374, and first network entity 305 may be configured to receive noise indicator 374 and process signal 372 based on a first noise covariance matrix or a second noise covariance matrix. In general, all of the operations described with reference to second network entity 315 may be performed by first network entity 305, and all of the operations described with reference to first network entity 305 may be performed by second network entity 315.

As described with reference to FIG. 3, the present disclosure provides techniques for mitigating noise, such as transmitter noise, based on a noise indicator, such as noise indicator 374. The disclosure may enhance a quality of communication among network entities, such as first network entity 305 and second network entity 315. Since the noise indicator indicates a transmitter noise associated with a transmitter of a transmitting network entity, the receiving network entity is configured to generate a noise covariance matrix, such as noise covariance matrix 320, 368, that accounts for the particular characteristics of the transmitter noise introduced into a transmitted signal by the transmitting network entity. In this manner, the receiving network entity may be better configured to extract or cancel, from a transmitted signal (e.g., signal 372), noise introduced into the transmitted signal by the transmitter than if the receiving network entity generated a covariance matrix based on a measured noise value, such as a SINR value. Additionally, or alternatively, processing (e.g., demodulation) of a signal (e.g., signal 372) based on a noise covariance matrix generated in accordance with a received noise indicator, such as noise indicator 374, may conserve computational and energy resources. To illustrate, in lieu of expending computational resources and energy to empirically determine noise, second network entity 315 may be configured to generate noise covariance matrix 320 based on noise indicator 374 and may forego generation of noise covariance matrix 320 based on empirically determined noise data. In this manner, processing of signal 372 via noise covariance matrix 320 based on noise indicator 374 may conserve computational resources and energy.

Figure 4:
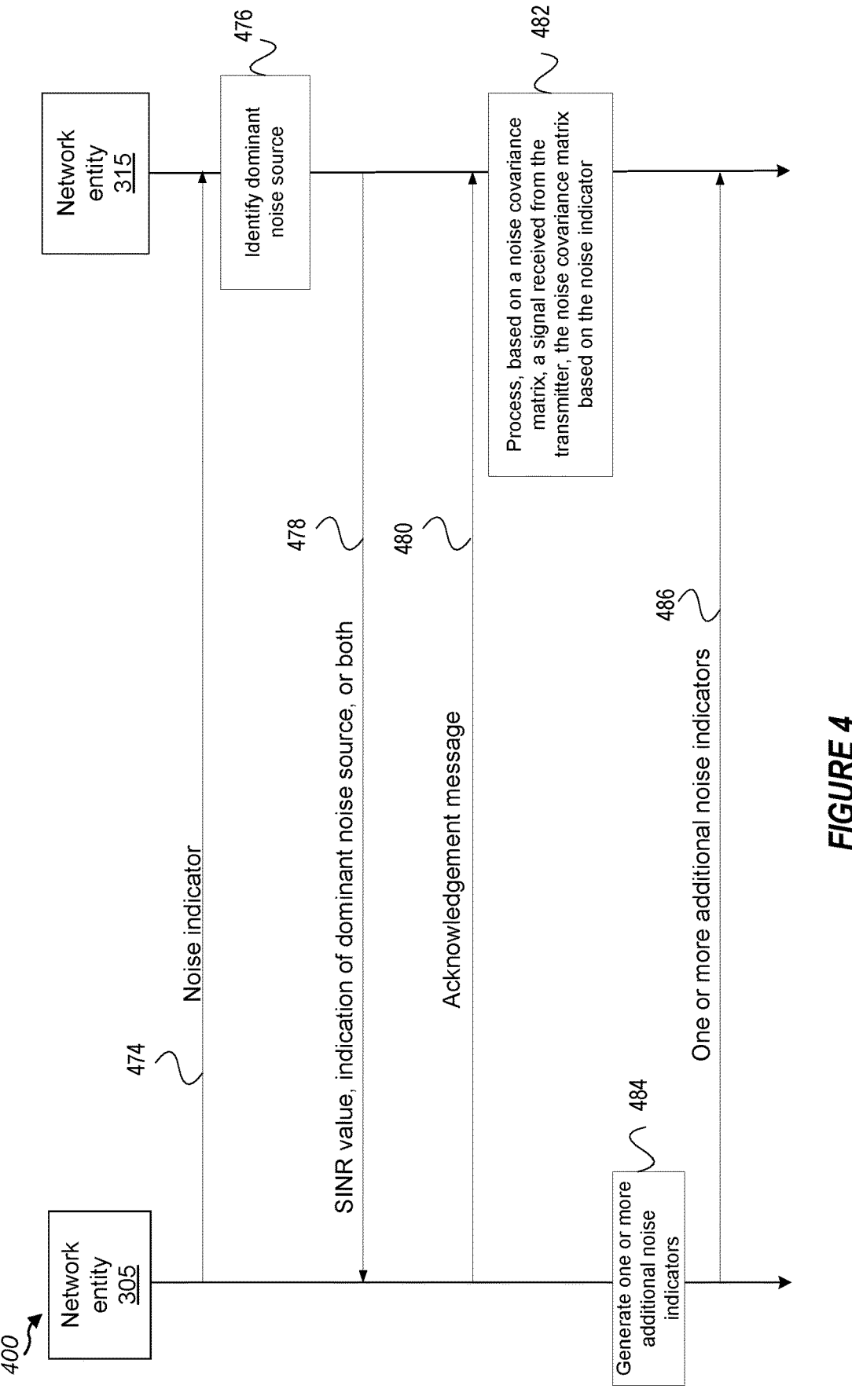
FIG. 4 is a ladder diagram illustrating an example of transmitter noise mitigation based on a noise indicator according to one or more aspects.

FIG. 4 is a ladder diagram illustrating an example of process 400 involving transmitter noise mitigation based on a noise indicator according to one or more aspects. As shown in FIG. 4, the depicted communication system includes first network entity 305 and second network entity 315 which may correspond, respectively, to first network entity 305 and second network entity 315 of FIG. 3.

Process 400 may include, at 474, receiving, at second network entity 315, a noise indictor that indicates a transmitter noise associated with a transmitter, such as a noise associated with or introduced by transmitter 356 of first network entity 305. The noise indicator may correspond to noise indicator 374. For example, upon initiation of a communication link between first network entity 305 and second network entity 315, first network entity 305 may transmit the noise indicator to second network entity 315. The noise indicator may be based on a full BW or may be signaled as a vector per BW size. Additionally, the noise indicator may indicate whether the noise is in band or out of band and a corresponding level of the noise. Further, the noise indicator may indicate whether noise was introduced into the signal, such as signal 372, before or after precoding of signal 372. Moreover, the noise indicator may include noise information corresponding to the noise, such as an amplitude value of the noise, a phase value of the noise, a variance of quantities associated with the noise, or a standard deviation of quantities associated with the noise. In some implementations, the noise indicator is based on DL EVM, UL EVM, or both. First network entity 305 may transmit the noise indicator to second network entity in an RRC message, an MAC-CE message, DCI, or a CSF.

Process 400 may further include, identifying, by second network entity 315, a dominant noise source of the transmitter noise. In some implementations, to identify the dominant noise source, second network entity 315 determines a variance of a receiver noise (e.g., a noise introduced by receiver 318 of second network entity 315) and compares the variance of the receiver noise to a level of the transmitter noise per port (e.g., a noise attributable to transmitter 356 of first network entity 305). Depending on the comparison, second network entity 315 may be configured to generate a first noise covariance matrix based on the noise indicator or a second noise covariance matrix based on measured noise data. Collectively, the first noise covariance matrix and the second noise covariance matrix may correspond to noise covariance matrix 320. In some implementations, in response to determining that the level of the transmitter noise per port is greater than or equal to the variance of the receiver noise, the second network entity may be configured to identify that the transmitter, such as transmitter 356 of first network entity 305, is the dominant noise source and may generate the first noise covariance matrix based on the noise indicator.

Subsequently, process 400 may include, at 478, transmitting, by second network entity 315 to first network entity 305, a measured SINR value, an indicator that includes an indication of a dominant noise source, or both. For example, second network entity 315 may measure a SINR and may transmit the measured SINR value to first network entity 305. As another example, the indicator that includes an indication of the dominant noise source may be an indication that the dominant noise source corresponds to a transmitter, such as to transmitter 356 of first network entity 305. Alternatively, the indicator that includes the indication of the dominant noise source may be an indication that the dominant noise source corresponds to a receiver, such as to receiver 318 of second network entity 315.

Process 400 may additionally include, at 480, receiving an acknowledgement message at second network entity 315 from first network entity 305. The acknowledgement message may include or correspond to an indication to process a signal transmitted by first network entity 305, such as signal 372, using the first noise covariance matrix based on the noise indicator. Additionally or alternatively, the acknowledgement message may include an indication to process the signal transmitted by first network entity 305, such as signal 372, using the second noise covariance matrix based on measured noise information, such as the SINR value. For example, in response to identifying, by first network entity 305, a rapidly time varying transmitter noise associated with transmitter 356 of first network entity 305, first network entity 305 may send an acknowledgement message to second network entity 315 to generate the second noise covariance matrix based on the measured noise and to process or demodulate the signal transmitted by first network entity 305 (e.g., signal 372) based on the second noise covariance matrix.

Moreover, process 400 may include, at 482, processing, by second network entity 315, a signal received from a transmitter of first network entity 305, such as signal 372, in accordance with the first noise covariance matrix.

Process 400 may further include, at 484, generating, by first network entity 305, one or more additional noise indicators after generation and transmission of the noise indicator. For instance, in response to a time varying transmitter condition of a transmitter of first network entity 305, first network entity 305 may be configured to generate the one or more additional noise indicators. A time varying transmitter condition may include a change in bandwidth, a channel condition, a PA output power, or a combination thereof. Subsequently, at 486, first network entity 305 may be configured to transmit the one or more additional noise indicators to second network entity 315, and second network entity 315 may be configured to receive the one or more additional noise indicators after receipt of the noise indicator. In this manner, the disclosure facilitates dynamic determination of transmitter noise conditions and may thus enhance demodulation of a signal by dynamically adjusting for changes to transmitter induced noise.

FIG. 5 is a flow diagram illustrating an example process 500 that supports transmitter noise mitigation based on a noise indicator according to one or more aspects. Operations of process 500 may be performed by a network entity, such as second network entity 315 described above with reference to FIGS. 1-4 or a network entity described with reference to FIG. 7. For example, a non-transitory computer-readable storage medium storing instructions, such as instructions 311, that, when executed by one or more processors, such as processor 302, may cause the one or more processors to perform the operations of process 500. Operations (also referred to as "blocks") of process 500 may enable network entity 315 to support transmitter noise mitigation based on a noise indicator according to one or more aspects.

In block 502, the network entity receives a noise indicator that indicates a transmitter noise associated with a transmitter. For example and referring to FIG. 3, communication interface 314 of second network entity 315 may be configured to receive noise indicator 374, indicating a transmitter noise associated with transmitter 356 of first network entity 305.

In block 504, the network entity demodulates, based on a noise covariance matrix, a signal received from the transmitter, the noise covariance matrix based on the noise indicator. For example and referring to FIG. 3, processor system 306 of second network entity 315 may be configured to process (e.g., demodulate) signal 372 based on noise covariance matrix 320 generated in accordance with noise indicator 374.

In some implementations, the noise indicator, such as noise indicator 372, corresponds to a noise ratio per layer, an EVM distortion factor, a noise floor, or a combination thereof. Additionally, the noise indicator may be based on a UL EVM, a DL EVM, a full BW of the transmitter, a vector per BWP size, or a combination thereof.

In some implementations, the transmitter noise may be associated with each port of the transmitter, is from each antenna of the transmitter, is from each panel of the transmitter, or a combination thereof. For instance, referring to FIG. 3, the transmitter noise may be associated with each port of transmitter 356, each antenna of transmitter 356, each panel of transmitter 356, or a combination thereof.

In some implementations, the noise indicator indicates statistics, the transmitter noise indicated by the statistics. The statistics may include an amplitude of the transmitter noise, a phase of the transmitter noise, a variance of the transmitter noise, a standard deviation of the transmitter noise, or a combination thereof. Additionally or alternatively, the noise indicator may indicate that the transmitter noise is in-band noise or out-of-band noise, a level of the transmitter noise, whether the transmitter noise was present before or after precoding of the signal, or a combination thereof.

In some implementations, the noise indicator is received concurrently with data received via a channel. For example, noise indicator 374 may be included in signal 372 that carries data 370. As another example, the noise indicator may be received during a communication session, such as a communication session between first network entity 305 and second network entity 315. In some implementations, the noise indicator may be received via an RRC message, an MAC-CE message, DCI, or a CSF transmitted through the channel.

In some implementations, a processor system, such as processor system 306, 362, is configured to establish a communication link with a transmitter, such as transmitter 316, 356. The noise indicator may be received in response to establishment of the communication link.

In some implementations, the communication interface, such as communication interface 314, 372, is configured to receive one or more additional noise indicators after receipt of the noise indicator. The one or more additional noise indicators may be received periodically or aperiodically. Additionally, in some implementations, to receive the one or more additional noise indicators, the communication interface may be configured to receive the one or more additional noise indicators in response to a time varying transmitter condition of a transmitter. The time varying transmitter condition may include or correspond to a change in bandwidth, a channel condition, a PA output power, or a combination thereof.

In some implementations, the processor system, such as processor system 306, 362, is configured to identify a dominant source of the transmitter noise. The processor system may generate the noise covariance matrix based on identification of the dominant source of the transmitter noise. In particular, to identify the dominant source of the transmitter noise, the processor system may be configured to compare a noise parameter extracted from the noise indicator with an SINR value. The noise parameter may indicate an EVM distortion factor, a noise floor, a noise ratio per layer, or a combination thereof.

In some implementations, to identify the dominant source of the transmitter noise, the processor system is configured to measure a receiver noise parameter associated with a receiver. For instance, and referring to FIG. 3, processor system 306 may be configured to measure a receiver noise parameter associated with receiver 318 to identify, for instance, whether the dominant source of the transmitter noise is primarily attributable to transmitter 356 of first network entity 305 or, instead, is primarily attributable to noise components introduced into the signal by receiver 318 of second network entity 315. Accordingly, the processor system may further be configured to compare the receiver noise parameter to a noise indicator parameter included in the noise indicator. As an example, the receiver noise parameter may include a receiver noise variance, and the noise indicator parameter includes an EVM distortion factor, a noise floor, a noise ratio per layer, or a combination thereof.

In some implementations, to generate the noise covariance matrix based on the identification of the dominant noise source, the processor system is configured to select the noise covariance matrix from a set of noise covariance matrices. The set of noise covariance matrices may include the noise covariance matrix calculated based on the noise indicator and another noise covariance matrix calculated based on a measured noise factor. For example, to select the noise covariance matrix, the processor system may be configured to compare a first variance of a channel estimated transmit noise derived from the noise indicator and a second variance of a channel estimated noise measured at a receiver. The channel estimated noise may include the transmit noise and a receive noise associated with the receiver. In response to the first variance being equal to or greater than the second variance, the processor system may be configured to select the noise covariance matrix.

In some implementations, the processor system is further configured to transmit a first indicator including an indication of a dominant noise source, that the noise covariance matrix is based on the noise indicator, or a combination thereof. Additionally, the processor system may be configured to measure an SINR value and transmit a measured SINR value. Additionally, the processor system may be configured to receive a second indicator including an indication to continue to use the noise covariance matrix based on the noise indicator, and the second indication may include a precoding indicator. Moreover, the processor system may be configured to calculate a variance of the transmitter noise based on a channel estimation, a level of the transmitter noise, a precoding indicator, or a combination thereof.

FIG. 6 is a flow diagram illustrating an example process 600 that supports transmitter noise mitigation based on a noise indicator according to one or more aspects. Operations of process 600 may be performed by a network entity, such as first network entity 305 described above with reference to FIGS. 1-4 or a network entity described with reference to FIG. 7. For example, a non-transitory computer-readable storage medium storing instructions, such as instructions 360, that, when executed by one or more processors, such as processor 352, may cause the one or more processors to perform the operations of process 5600. Operations (also referred to as "blocks") of process 600 may enable network entity 3015 to support noise indicator intermediated signal demodulation according to one or more aspects.

In block 602, the network entity may generate a noise indicator that is indicative of a transmitter noise associated with a transmitter. For instance and referring to FIG. 3, processor system 362 of first network entity 305 may be configured to generate noise indicator 374 that is indicative of a transmitter noise associated with transmitter 356. In some implementations, processor system 362 may be configured to generate the noise indicator based on noise indicator parameter 364, which may include or correspond to an EVM distortion factor, a noise floor, a noise ratio per layer, or a combination thereof.

In block 604, the network entity may transmit the noise indicator. For instance and referring to FIG. 3, communication interface 372 of first network entity 305 may be configured to transmit noise indicator 374 to network entity 315.

In some implementations, the network entity, such as first network entity 305 of FIGS. 1-4, may be configured to receive a SINR value measured by second network entity

315, an indicator including an indication of a dominant noise source determined by second network entity 315, or both. In response to receipt of the foregoing indicator, first network entity 305 may be configured to transmit an acknowledgement message to second network entity 315. For example, the acknowledgment message may be an indicator including an indication, to second network entity 315, to demodulate, based on a noise covariance matrix, a signal received from a transmitter of network entity 305, the noise covariance matrix based on the noise indicator.

In some implementations, the network entity, such as first network entity 305, may be configured to generate and transmit to second network entity 315 one or more additional noise indicators. For example, in response to identifying a time varying transmitter condition of the transmitter of first network entity 305, first network entity 305 may be configured to generate the one or more additional noise indicators. Such time varying transmitter conditions may include a change in bandwidth, a channel condition, a PA output power, or a combination thereof.

Figure 7:
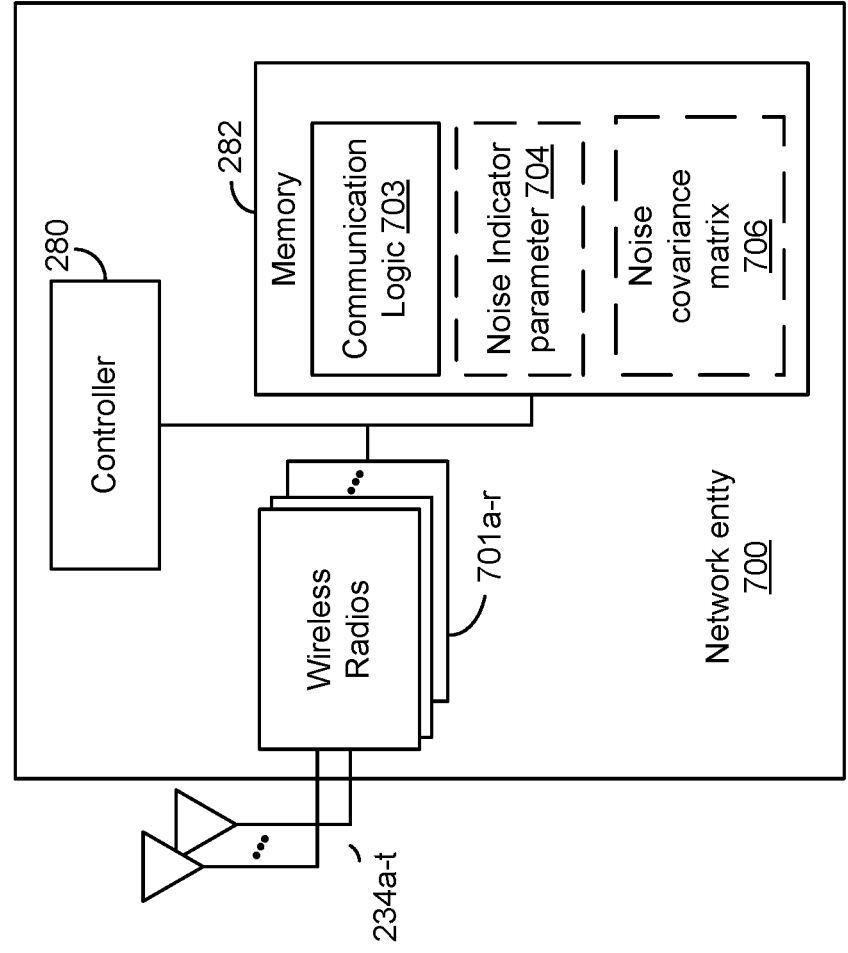
FIG. 7 is a flow diagram illustrating an example process that supports transmitter noise mitigation based on a noise indicator according to one or more aspects.

FIG. 7 is a block diagram of an example network entity 700 that supports transmitter noise mitigation based on a noise indicator according to one or more aspects. Network entity 700 may be configured to perform operations, including the blocks of a processes described with reference to FIGS. 5, 6, or both. In some implementations, network entity 700 includes the structure, hardware, and components shown and described with reference to network entity 305, 315 of FIGS. 1-4. For example, network entity 700 includes controller 280, which operates to execute logic or computer instructions stored in memory 282, as well as controlling the components of network entity 700 that provide the features and functionality of network entity 700. Network entity 700, under control of controller 280, transmits and receives signals via wireless radios 701*a-r* and antennas 234*a-t*. Wireless radios 701*a-r* include various components and hardware, as illustrated in FIG. 2 for UE 115, base station 105, or both, including modulator and demodulators 254*a-r*, MIMO detector 256, receive processor 258, transmit processor 264, and TX MIMO processor 266.

As shown, memory 282 may include communication logic 703, noise indicator parameter 704, and noise covariance matrix 706. Communication logic 703 may be configured to enable communication between network entity 700 and one or more other devices. Network entity 700 may receive signals from or transmit signals to one or more network entities. Noise indicator parameter may correspond to noise indicator parameter 312, 364. Noise covariance matrix 706 may correspond to noise covariance matrices 320, 368.

It is noted that one or more blocks (or operations) described with reference to FIGS. 5 and 6 may be combined with one or more blocks (or operations) described with reference to another of the figures. For example, one or more blocks (or operations) of FIG. 5 may be combined with one or more blocks (or operations) of FIG. 6. As another example, one or more blocks associated with FIGS. 5 and 6 may be combined with one or more blocks (or operations) associated with FIGS. 1-4. Additionally, or alternatively, one or more operations described above with reference to FIGS. 1-4 may be combined with one or more operations described with reference to FIGS. 5, 6, or both.

In one or more aspects, techniques for supporting transmitter noise mitigation based on a noise indicator may include additional aspects, such as any single aspect or any combination of aspects described below or in connection with one or more other processes or devices described elsewhere herein. In a first aspect, techniques for supporting noise indicator intermediated signal demodulation may include receiving a noise indicator that indicates a transmitter noise associated with a transmitter. The techniques may further include demodulating, based on a noise covariance matrix, a signal received from the transmitter, the noise covariance matrix based on the noise indicator. In some examples, the techniques of the first aspect may be implemented in a wireless communication device, which may include a network entity or a component of a network entity. In some examples, the wireless communication device may include a communication interface configured to receive a noise indicator that indicates a transmitter noise associated with a transmitter. Additionally, the wireless communication device may include a processor system configured to demodulate, based on a noise covariance matrix, a signal received from the transmitter, the noise covariance matrix based on the noise indicator. In some examples, the techniques of the first aspect may be implemented in a method or process. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the noise indicator corresponds to a noise ratio per layer, an EVM distortion factor, a noise floor, or a combination thereof.

In a third aspect, in combination with one or more of the first aspect and the second aspect, the noise indicator is based on a UL EVM, a DL EVM, a full BW of the transmitter, a vector per BWP size, or a combination thereof.

In a fourth aspect, in combination with one or more of the first aspect through the third aspect, the transmitter noise is associated with each port of the transmitter, is from each antenna of the transmitter, is from each panel of the transmitter, or a combination thereof.

In a fifth aspect, in combination with one or more of the first aspect through the fourth aspect, the noise indicator indicates statistics, the transmitter noise indicated by the statistics.

In a sixth aspect, in combination with one or more of the first aspect through the fifth aspect, the statistics include an amplitude of the transmitter noise, a phase of the transmitter noise, a variance of the transmitter noise, a standard deviation of the transmitter noise, or a combination thereof.

In a seventh aspect, in combination with one or more of the first aspect through the sixth aspect, the noise indicator indicates that the transmitter noise is in-band noise or out-of-band noise, a level of the transmitter noise, whether the transmitter noise was present before or after precoding of the signal, or a combination thereof.

In an eighth aspect, in combination with one or more of the first aspect through the seventh aspect, the noise indicator is received concurrently with data received via a channel.

In a ninth aspect, in combination with one or more of the first aspect through the eighth aspect, the noise indicator is received, during a communication session, via an RRC message, an MAC-CE message, DCI, or a CSF transmitted through the channel. In a tenth aspect, in combination with one or more of the first aspect through the ninth aspect, the processor system is further configured to establish a communication link with the transmitter.

In a tenth aspect, in combination with one or more of the first aspect through the ninth aspect, the noise indicator is received in response to establishment of the communication link.

In an eleventh aspect, in combination with one or more of the first aspect through the tenth aspect, the communication interface is configured to receive one or more additional noise indicators after receipt of the noise indicator.

In a twelfth aspect, in combination with one or more of the first aspect through the eleventh aspect, the one or more additional noise indicators are received periodically or aperiodically.

In a thirteenth aspect, in combination with one or more of the first aspect through the twelfth aspect, to receive the one or more additional noise indicators, the communication interface is configured to receive the one or more additional noise indicators in response to a time varying transmitter condition of the transmitter.

In a fourteenth aspect, in combination with one or more of the first aspect through the thirteenth aspect, the time varying transmitter condition includes a change in bandwidth, a channel condition, a PA output power, or a combination thereof.

In a fifteenth aspect, in combination with one or more of the first aspect through the fourteenth aspect, the processor system is further configured to identify a dominant source of the transmitter noise.

In a sixteenth aspect, in combination with one or more of the first aspect through the fifteenth aspect, the processor system is further configured to generate the noise covariance matrix based on identification of the dominant source of the transmitter noise.

In a seventeenth aspect, in combination with one or more of the first aspect through the sixteenth aspect, to identify the dominant source of the transmitter noise, the processor system is configured to compare a noise parameter extracted from the noise indicator with an SINR value.

In an eighteenth aspect, in combination with one or more of the first aspect through the seventeenth aspect, the noise parameter indicates an EVM distortion factor, a noise floor, a noise ratio per layer, or a combination thereof.

In a nineteenth aspect, in combination with one or more of the first aspect through the eighteenth aspect, to identify the dominant source of the transmitter noise, the processor system is configured to measure a receiver noise parameter associated with a receiver.

In a twentieth aspect, in combination with one or more of the first aspect through the nineteenth aspect, to identify the dominant source of the transmitter noise, the processor system is configured to compare the receiver noise parameter to a noise indicator parameter included in the noise indicator.

In a twenty first aspect, in combination with one or more of the first aspect through the twentieth aspect, the receiver noise parameter includes a receiver noise variance.

In a twenty second aspect, in combination with one or more of the first aspect through the twenty first aspect, the noise indicator parameter includes an EVM distortion factor, a noise floor, a noise ratio per layer, or a combination thereof.

In a twenty third aspect, in combination with one or more of the first aspect through the twenty second aspect, to generate the noise covariance matrix based on the identification of the dominant noise source, the processor system is configured to select the noise covariance matrix from a set of noise covariance matrices.

In a twenty fourth aspect, in combination with one or more of the first aspect through the twenty third aspect, the set of noise covariance matrices includes the noise covariance matrix calculated based on the noise indicator and another noise covariance matrix calculated based on a measured noise factor.

In a twenty fourth aspect, in combination with one or more of the first aspect through the twenty third aspect, to select the noise covariance matrix, the processor system is configured to compare a first variance of a channel estimated transmit noise derived from the noise indicator and a second variance of a channel estimated noise measured at a receiver.

In a twenty fifth aspect, in combination with one or more of the first aspect through the twenty fourth aspect, the channel estimated noise includes the transmit noise and a receive noise associated with the receiver.

In a twenty sixth aspect, in combination with one or more of the first aspect through the twenty fifth aspect, in response to the first variance being equal to or greater than the second variance, the processor system is configured to select the noise covariance matrix.

In a twenty seventh aspect, in combination with one or more of the first aspect through the twenty sixth aspect, the processor system is further configured to transmit a first indication of a dominant noise source, that the noise covariance matrix is based on the noise indicator, or a combination thereof.

In a twenty eighth aspect, in combination with one or more of the first aspect through the twenty seventh aspect, the processor system is further configured to measure an SINR value.

In a twenty ninth aspect, in combination with one or more of the first aspect through the twenty eight aspect, the processor system is further configured to transmit a measured SINR value.

In a thirtieth aspect, in combination with one or more of the first aspect through the twenty ninth aspect, the processor system is further configured to receive a second indication to continue to use the noise covariance matrix based on the noise indicator.

In a thirty first aspect, in combination with one or more of the first aspect through the thirtieth aspect, the second indication includes a precoding indicator.

In a thirty second aspect, in combination with one or more of the first aspect through the thirty first aspect, the processor system is further configured to calculate a variance of the transmitter noise based on a channel estimation, a level of the transmitter noise, a precoding indicator, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A. B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent. As used herein, the term "based on" means based "only on" and "based, at least in part, on".

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus including:
a communication interface configured to receive a noise indicator that indicates a transmitter noise associated with a transmitter,
wherein the noise indicator corresponds to a noise ratio per layer, an error vector magnitude (EVM) distortion factor, a noise floor, or a combination thereof, and
wherein the noise indicator is based on an uplink (UL) EVM, a downlink (DL) EVM, a full bandwidth (BW) of the transmitter, a vector per bandwidth part (BWP) size, or a combination thereof; and
a processor system configured to demodulate, based on a noise covariance matrix, a signal received from the transmitter, the noise covariance matrix based on the noise indicator.

2. The apparatus of claim 1, wherein the transmitter noise is associated with each port of the transmitter, is from each antenna of the transmitter, is from each panel of the transmitter, or a combination thereof.

3. The apparatus of claim 1, wherein:
the noise indicator indicates statistics, the transmitter noise indicated by the statistics, and
the statistics include an amplitude of the transmitter noise, a phase of the transmitter noise, a variance of the transmitter noise, a standard deviation of the transmitter noise, or a combination thereof.

4. The apparatus of claim 1, wherein the noise indicator indicates that the transmitter noise is in-band noise or out-of-band noise, a level of the transmitter noise, whether the transmitter noise was present before or after precoding of the signal, or a combination thereof.

5. The apparatus of claim 1, wherein:
the noise indicator is received concurrently with data received via a channel, and
the noise indicator is received, during a communication session, via a radio resource control (RRC) message, a medium access control (MAC)-control element (CE) message, a downlink control information (DCI), or a caching and downlink resource sharing optimization framework (CSF) transmitted through the channel.

6. The apparatus of claim 5, wherein the processor system is further configured to:
establish a communication link with the transmitter, and
wherein the noise indicator is received in response to establishment of the communication link.

7. The apparatus of claim 1, wherein the communication interface is configured to receive one or more additional noise indicators after receipt of the noise indicator, the one or more additional noise indicators received periodically or aperiodically.

8. The apparatus of claim 7, wherein:
to receive the one or more additional noise indicators, the communication interface is configured to receive the one or more additional noise indicators in response to a time varying transmitter condition of the transmitter, and
the time varying transmitter condition includes a change in bandwidth, a channel condition, a power amplifier (PA) output power, or a combination thereof.

9. The apparatus of claim 1, wherein the processor system is further configured to:
identify a dominant source of the transmitter noise; and
generate the noise covariance matrix based on identification of the dominant source of the transmitter noise.

10. The apparatus of claim 9, wherein:
to identify the dominant source of the transmitter noise, the processor system is configured to compare a noise parameter extracted from the noise indicator with a signal to interference noise ratio (SINR) value, and
the noise parameter indicates an error vector magnitude (EVM) distortion factor, a noise floor, a noise ratio per layer, or a combination thereof.

11. The apparatus of claim 9, wherein, to identify the dominant source of the transmitter noise, the processor system is configured to:

measure a receiver noise parameter associated with a receiver, and compare the receiver noise parameter to a noise indicator parameter included in the noise indicator, wherein:

the receiver noise parameter includes a receiver noise variance, and the noise indicator parameter includes an error vector magnitude (EVM) distortion factor, a noise floor, a noise ratio per layer, or a combination thereof.

12. The apparatus of claim 9, wherein, to generate the noise covariance matrix based on the identification of the dominant noise source, the processor system is configured to select the noise covariance matrix from a set of noise covariance matrices, the set of noise covariance matrices including the noise covariance matrix calculated based on the noise indicator and another noise covariance matrix calculated based on a measured noise factor.

13. The apparatus of claim 12, wherein:

to select the noise covariance matrix, the processor system is configured to compare a first variance of a channel estimated transmit noise derived from the noise indicator and a second variance of a channel estimated noise measured at a receiver, the channel estimated noise includes the transmit noise and a receive noise associated with the receiver, and in response to the first variance being equal to or greater than the second variance, the processor system is configured to select the noise covariance matrix.

14. The apparatus of claim 1, wherein the processor system is further configured to:

transmit a first indication of a dominant noise source, that the noise covariance matrix is based on the noise indicator, or a combination thereof;

measure a signal to interference noise ratio (SINR) value;

transmit a measured SINR value;

receive a second indication to continue to use the noise covariance matrix based on the noise indicator, wherein the second indication includes a precoding indicator; and calculate a variance of the transmitter noise based on a channel estimation, a level of the transmitter noise, a precoding indicator, or a combination thereof.

15. A method of wireless communication, the method including:

receiving a noise indicator that indicates a transmitter noise associated with a transmitter, wherein the noise indicator corresponds to a noise ratio per layer, an error vector magnitude (EVM) distortion factor, a noise floor, or a combination thereof, and wherein the noise indicator is based on an uplink (UL) EVM, a downlink (DL) EVM, a full bandwidth (BW) of the transmitter, a vector per bandwidth part (BWP) size, or a combination thereof; and demodulating, based on a noise covariance matrix, a signal received from the transmitter, the noise covariance matrix based on the noise indicator.

16. The method of claim 15, further including:

identifying a dominant source of the transmitter noise.

17. The method of claim 16, further including:

transmitting a first indication of the dominant noise source, that the noise covariance matrix is based on the noise indicator, or a combination thereof;

measuring a signal to interference noise ratio (SINR) value; and transmitting a measured SINR value.

18. The method of claim 17, further including:

receiving a second indication to continue to use the noise covariance matrix based on the noise indicator, wherein the second indication includes a precoding indicator.

19. The method of claim 16, wherein:

identifying the dominant source of the transmitter noise by comparing a noise parameter extracted from the noise indicator with a signal to interference noise ratio (SINR) value, and the noise parameter indicates an error vector magnitude (EVM) distortion factor, a noise floor, a noise ratio per layer, or a combination thereof.

20. The method of claim 15, further including:

generating the noise covariance matrix based on identification of a dominant noise source of the transmitter noise.

21. The method of claim 20, wherein identifying the dominant source of the transmitter noise includes:

measuring a receiver noise parameter associated with a receiver, and comparing the receiver noise parameter to a noise indicator parameter included in the noise indicator, wherein:

the receiver noise parameter includes a receiver noise variance, and the noise indicator parameter includes an error vector magnitude (EVM)

distortion factor, a noise floor, a noise ratio per layer, or a combination thereof.

22. The method of claim 15, further including:

receiving one or more additional noise indicators after receipt of the noise indicator, the one or more additional noise indicators received periodically or aperiodically.

23. The method of claim 22, wherein:

receiving the one or more additional noise indicators after receipt of the noise indicator includes receiving the one or more additional noise indicators in response to a time varying transmitter condition of the transmitter, and the time varying transmitter condition includes a change in bandwidth, a channel condition, a power amplifier (PA) output power, or a combination thereof.

24. An apparatus for wireless communication, the apparatus including:

means for receiving a noise indicator that indicates a transmitter noise associated with a transmitter, wherein the noise indicator corresponds to a noise ratio per layer, an error vector magnitude (EVM) distortion factor, a noise floor, or a combination thereof, and wherein the noise indicator is based on an uplink (UL) EVM, a downlink (DL) EVM, a full bandwidth (BW) of the transmitter, a vector per bandwidth part (BWP) size, or a combination thereof; and means for demodulating, based on a noise covariance matrix, a signal received from the transmitter, the noise covariance matrix based on the noise indicator.

25. The apparatus of claim 24, wherein the means for demodulating further includes:

means for identifying a dominant source of the transmitter noise; and means for generating the noise covariance matrix based on identification of a dominant noise source of the transmitter noise.

26. The apparatus of claim 24, wherein the means for receiving the noise indicator includes means for receiving one or more additional noise indicators after receipt of the noise indicator, the one or more additional noise indicators received periodically or aperiodically.

27. A non-transitory computer-readable storage medium storing instructions that, when executed by one or more processors, cause the one or more processors to perform operations for wireless communication, the operations including:

receiving a noise indicator that indicates a transmitter noise associated with a transmitter, wherein the noise indicator corresponds to a noise ratio per layer, an error vector magnitude (EVM) distortion factor, a noise floor, or a combination thereof, and wherein the noise indicator is based on an uplink (UL) EVM, a downlink (DL) EVM, a full bandwidth (BW) of the transmitter, a vector per bandwidth part (BWP) size, or a combination thereof; and demodulating, based on a noise covariance matrix, a signal received from the transmitter, the noise covariance matrix based on the noise indicator.

28. The non-transitory computer-readable storage medium of claim 27, wherein the operations further include:

receiving one or more additional noise indicators in response to a time varying transmitter condition of the transmitter, and the time varying transmitter condition includes a change in bandwidth, a channel condition, a power amplifier (PA) output power, or a combination thereof.

29. The non-transitory computer-readable storage medium of claim 27, wherein the operations further include:

identifying a dominant source of the transmitter noise; and generating the noise covariance matrix based on identification of a dominant noise source of the transmitter noise.

* * * * *